US006035710A

United States Patent [19]
Hutchison et al.

[11] Patent Number: 6,035,710
[45] Date of Patent: Mar. 14, 2000

[54] CLOUD BASE HEIGHT AND WEATHER CHARACTERIZATION, VISUALIZATION AND PREDICTION BASED ON SATELLITE METEOROLOGICAL OBSERVATION

[75] Inventors: Keith D. Hutchison, Austin, Tex.; Phillip C. Topping, Saratoga, Calif.; Thomas Turner Wilheit, Jr., College Station, Tex.

[73] Assignees: Lockheed Martin Missiles & Space Co., Sunnyvale, Calif.; Brazos Earth System Science, College Station, Tex.

[21] Appl. No.: 09/321,573

[22] Filed: May 28, 1999

[51] Int. Cl.[7] ..................................................... G01W 1/00
[52] U.S. Cl. .................................. 73/170.16; 73/170.28; 702/3
[58] Field of Search ........................... 73/170.16, 170.17, 73/170.18, 170.27, 170.28; 342/357.03; 702/3, 130, 134

[56] References Cited

U.S. PATENT DOCUMENTS

| | | |
|---|---|---|
| 4,724,439 | 2/1988 | Wiley et al. |
| 5,077,609 | 12/1991 | Manelphe |
| 5,135,397 | 8/1992 | Yen |
| 5,528,493 | 6/1996 | Potter ........................................ 364/420 |
| 5,675,081 | 10/1997 | Solheim et al. ...................... 73/170.28 |

OTHER PUBLICATIONS

Wilheit et al., "Water Vapour Profile Retrievals from SSM/T–2 data constrained by infrared–based cloud Parameters," Int.J. Remote Sensing, 1997, vol. 18, No. 15, pp. 3263–3277.

K.D. Hutchison, "Application of 1·38 $\mu$m imagery for thin cirrus detection in daytime imagery collected over land surfaces," Int.J. Remote Sensing, 1996, vol. 17, No. 17, pp. 3325–3342.

Lamei et al., "Cloud–type Discrimination Via Multispectral Textural Analysis," Optical Engineering, Apr. 1994, vol. 33, No. 4, pp. 1303–1313.

Hutchison et al., "Validation of automated cloud top phase algorithms: distinguishing between cirrus clouds and snow in a priori analyses of AVHRR imagery," Optical Engineering, vol. 36, No. 6, Jun. 1997, pp. 1727–1737.

Hutchison et al., "Cloud top phase determination from the fusion of signatures in daytime AVHRR imagery and HIRS data," Int. J. Remote Sensing, 1997, vol. 18, No. 15, pp. 3245–3262.

Hutchison et al., "Threshold functions for automated cloud analyses of global meteorological satellite imagery," Int. J. Remote Sensing, 1995, vol. 16, No. 18, pp. 3665–3680.

(List continued on next page.)

*Primary Examiner*—Benjamin R. Fuller
*Assistant Examiner*—Abdullahi Aw-musse
*Attorney, Agent, or Firm*—Morgan & Finnegan, LLP

[57] ABSTRACT

A method exploits the spectral signature of cloud bases in microwave moisture sounder data to determine cloud base heights. This signature requires the accurate specification of cloud top height, which in a preferred embodiment, comes from the analysis of data provided by an electro-optical sensor (EO) such as the Advanced Very High Resolution Radiometer (AVHRR) instrument flown on operational NOAA satellites. The method includes a receiving step in which satellite EO (visible through infrared) and microwave radiance data of a view of the earth's atmosphere is received. The view has both location and time information. In a determining step, cloud top height is determined based on the EO and infrared radiance data. Moisture profiles of the view are retrieved in a retrieving step based on the microwave radiance data. Subsequently, in a determining step, cloud base heights of clouds in the view are determined using cloud top heights as a constraint in the retrieval of moisture profiles with tile microwave data. With the cloud base height information, three dimensional models of the clouds may be constructed based on the cloud top heights, cloud base heights and moisture data which may be used for weather visualization and prediction.

18 Claims, 6 Drawing Sheets

OTHER PUBLICATIONS

Hutchison et al., "Improved Detection of Optically Thin Cirrus Clouds in Nighttime Multispectral Meteorological Satellite Using Total Integrated Water Vapor Information," Journal of Applied Meteorology, May, 1995, vol. 34, pp. 1161–1168.

Hutchison et al., "Snow cover identification through cirrus–cloudy atmospheres using daytime AVHRR imagery," Geophysical Research Letters, vol. 24, No. 14, Jul. 15, 1997, pp. 1791–1794.

CLOUD BASE HEIGHT AND WEATHER CHARACTERIZATION, VISUALIZATION AND PREDICTION BASED ON SATELLITE METEOROLOGICAL OBSERVATION

This invention was made with government support and the United States Government has certain rights in this invention.

FIELD OF THE INVENTION

The present invention relates to meteorological observation, cloud characterization and weather forecasting. More specifically, the present invention relates to retrieval of three dimensional cloud fields, based upon the analysis of meteorological satellite observations, into moisture fields which can be used to visualize the present weather and predict future conditions at global locations.

BACKGROUND OF THE INVENTION

Information on clouds, and in particular the height of cloud bases, is extremely important for many areas of meteorology, including aviation weather, relatively short term weather forecasts, and long-term climate studies. It is straightforward to measure the base height of a cloud from the ground. For example, many airports are equipped with ceiliometers for this purpose. In addition, data collected by radiosondes may be interpreted to estimate both cloud bases and tops, but with some drawbacks. For example, the ground-based measurements of cloud base height can be quite accurate, but radiosondes can become saturated in high humidity environments and provide inaccurate reading. In addition, their coverage is rather limited, i.e. to localized areas around an observation area. Thus, these measurements are obviously not available over the ocean, which covers ¾ of the Earth's surface. Therefore, the retrieval of cloud base heights from global satellite observations becomes highly desirable.

There is a wide range of useful measurement accuracies for cloud base heights, depending upon the applications. For example, a minimum accuracy of 2 km is specified as a program requirement for the National Polar-orbiting Operational Environmental Satellite System (NPOESS). Such accuracy may prove useful for some climate studies. However, for airport approach and landing weather, especially for remote locations such as the approach over the Gulf of Alaska into Anchorage, and to develop global energy budgets used in climate change studies, higher accuracies, to the order of 30–100 m if possible, are required. There is a need for a satellite based approach for the determination of global cloud base information with such accuracies.

Satellite observation of clouds are made from several platforms. For example, the SSM/T-2 is a microwave radiometer flown on recently launched DMSP satellites and it is used primarily for the retrieval of water vapor profiles, as discussed by al Khalaf, "Retrieval of atmospheric water vapor profiles from the Special Sensor Microwave Temperature-2 (S SMT-2)." Ph.D. Dissertation, Department of Meteorology, Texas A&M University, College Station, Tex. 145, May 1995. In his work, al Khalaf treats liquid clouds explicitly in the retrieval which can be obtained from another DMSP sensor known as the Special Sensor Microwave Imager (SSMI). In so doing, al Khalaf's algorithms assign top and bottom heights to the cloud but does not retrieve them from the SSM/T-2 data.

A paper by T. T. Wilheit and K D. Hutchison "Water vapor profile retrievals from SSMT-2 data constrained by infrared-based cloud parameters," IEEE J. Remote Sensing, vol. 18 pp. 3263–3277, 1997 discloses that independent estimates of the cloud top height and phase can be used to further improve the water vapor profiles retrieved from SSM/T-2 data. They showed an example of a retrieval for a case where the radiosonde clearly showed the presence of a thin cloud layer. Without the use of cloud top information, which was retrieved from AVHRR imagery, the water vapor profile retrieval using SSM/T-2 data failed to detect the presence of the cloud. When the cloud top information was used to force a cloud in the retrieval of the microwave data, an "apparent" cloud thickness resulted. However, this research provided no indication on the reliability of the cloud thickness or the existence of a useful signature in the microwave data which could be exploited in the retrieval of a cloud base. Thus, while alluding to the "appearance" of a cloud base height in the paper, the authors noted that cloud base was considered totally unreliable and required additional research to determine if in fact the results were real or merely an artifact of the non-linear relationships in the retrieval algorithm.

Although much information on clouds is retrievable from satellite observation, there remains a need to identify a cloud base signature from satellite meteorological data. There is a further need to develop an algorithm to exploit the cloud base signature to determine cloud base heights for clouds around the globe and particularly over water where ground based observation is not available.

SUMMARY OF THE INVENTION

According to the present invention, a method exploits the spectral signature of cloud bases in microwave moisture sounder data to determine cloud base heights. Work on the retrieval of cloud bases from meteorological satellites by the applicants follows a lengthy period of investigation which only recently culminated in their conclusion that a spectral signature is present in the microwave moisture sounder data which can be exploited to provide a cloud base height from space. This signature requires the accurate specification of cloud top height, which in a preferred embodiment, comes from the analysis of data provided by an electro-optical sensor (EO) such as the Advanced Very High Resolution Radiometer (AVHRR) instrument flown on operational NOAA satellites.

According to the present invention, a method allows the 3-dimensional characterization of clouds using remotely sensed meteorological satellite data and includes the following steps. Receiving satellite EO data, visible through infrared and microwave radiance data of a view of the earth's atmosphere, the view having location and time information. In a determining step, cloud top height, temperature or pressure are determined from the EO data. Moisture profiles of the view are retrieved in a retrieving step based on the microwave radiance data. Subsequently, in a retrieving step, cloud base heights of clouds in the view are retrieved using cloud top heights as a constraint in the retrieval of moisture profiles with the microwave data.

Subsequently, three dimensional models of the clouds may be constructed based on the cloud top heights and cloud base heights and the location information. The three dimensional models of the clouds may then be displayed for a user. A geographic model of at least a portion of the earth's surface may be used in displaying the three dimensional models of the clouds with the geographic model based on the location information. Additionally, the 3-dimensional cloud fields may be fed into a forecast system which generates 3-dimensional cloud forecast fields based on weather models.

BRIEF DESCRIPTION OF THE FIGURES

The above described objects, features and advantages will be more fully appreciated with reference to the detailed description and the appended figures described below.

DETAILED DESCRIPTION

Figure 1:
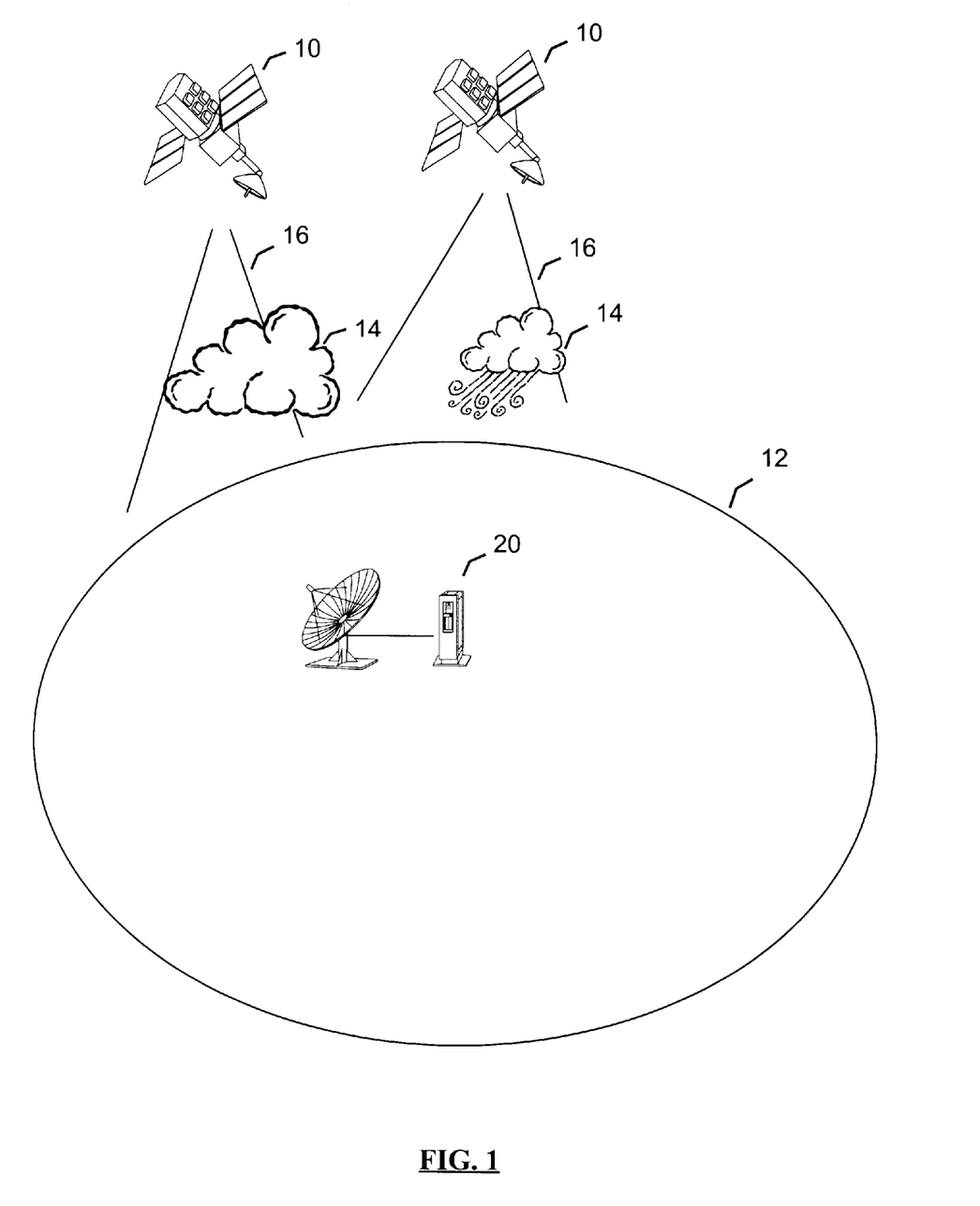
FIG. 1 depicts a view of remote atmospheric sensing operations being performed by satellites over the earth.

FIG. 1 depicts a view of remote atmospheric sensing operations being performed by satellites 10 over the earth 12. The satellites 10 are typically in polar or near Earth orbit since the methodology utilizes microwave sensors which are not flown from geosynchronous orbit due to the size of the microwave antenna that would be needed to provide these data. The satellites 10 are typically equipped, in a well-known manner, with passive sensors, i.e. ones which emit no energy but gather energy using antennas, focal planes, or CCD devices to capture emitted spectral frequencies from the earth's atmosphere or the earth's surface itself. The capturing devices are henceforth referred to as imagers operating at frequencies which undergo small amounts of atmospheric absorption (also known as operating in window regions) or sounders if designed primarily to collect emissions from different levels of the atmosphere (operating in absorption bands). The electro-optical sensor (EO) device is an imager while the microwave moisture sensor is a sounder.

These satellite based sensors have a field of view 16 with respect to the earth at any given time and which may change with time as the satellite orbits. The field of view 16 includes a plurality of pixels which each represent atmospheric satellite data collected for a specific range of frequencies and from a specific portion of the earth's atmosphere at a time certain. The satellite atmospheric data is typically continuously transmitted to direct readout sites around the globe to weather computer systems 20, such as the LAPS system, or it may be collected and transmitted at a later time to larger facilities such as systems maintained by NOAA, on the earth's surface. The weather computer system 20 then performs calculations on each pixel of the atmospheric satellite data in order to determine characteristics of the earth's surface and atmosphere at the location and time represented by the pixel. The calculations may illustratively include detection of clouds and associated cloud parameters, moisture profiles and temperature profiles.

One satellite based sensor that is in present use on NOAA TIROS satellites is an infrared sounder while another is the EO (AVHRR) imager. Each pixel of this infrared sounder has a field of view 16 of approximately 10–15 km at satellite subpoint when projected onto the earth's surface and may be used to characterize atmospheric conditions and cloud top pressures in a well known manner. The infrared sounder receives most of its energy from the 15 $\mu$m carbon dioxide band, although it collects energy from other bands as well, e.g. 4 $\mu$m region.

The EO imager collects data at a higher resolution than the infrared sounder, with each pixel having a field of view 16 of approximately 1 km at satellite subpoint when projected onto the earth's surface. EO imagers collect energy in several atmospheric "windows", including 0.5–2 $\mu$m, 3–5 $\mu$m and 8–12 $\mu$m wavelengths intervals. These wavelengths are typically used to determine Earth surface characteristics, detect the presence of clouds, and measure other characteristics of clouds when present.

Still another satellite based sensor is a microwave sounder. Each pixel in a microwave sensor has a field of view 16 approximately 25–200 km at the nadir of a polar orbit, depending upon the frequency of energy collected and the size of the antenna. An example of a microwave imager is the SSM/I while the SSM/T2 is a microwave sounder. Both these sensors are flown on the Defense Meteorological Satellite Program ("DMSP") satellites. The SSM/I microwave sounder monitors frequencies around the 60 GHz oxygen band as has a resolution of nominally 200 km. The SSM/I also monitors the 22.235 and 37 GH channels with resolutions of about 60 and 30 km, respectively. The SSM/T2 microwave sounder monitors frequencies which are useful for retrieval of water vapor profiles. These frequencies are near 183 Ghz and typically include: 183 GHz+−1; 183 GHz+−3; 183 GHz+−7; 150 GHz. It has a nominal resolution of about 50 km.

Figure 2:
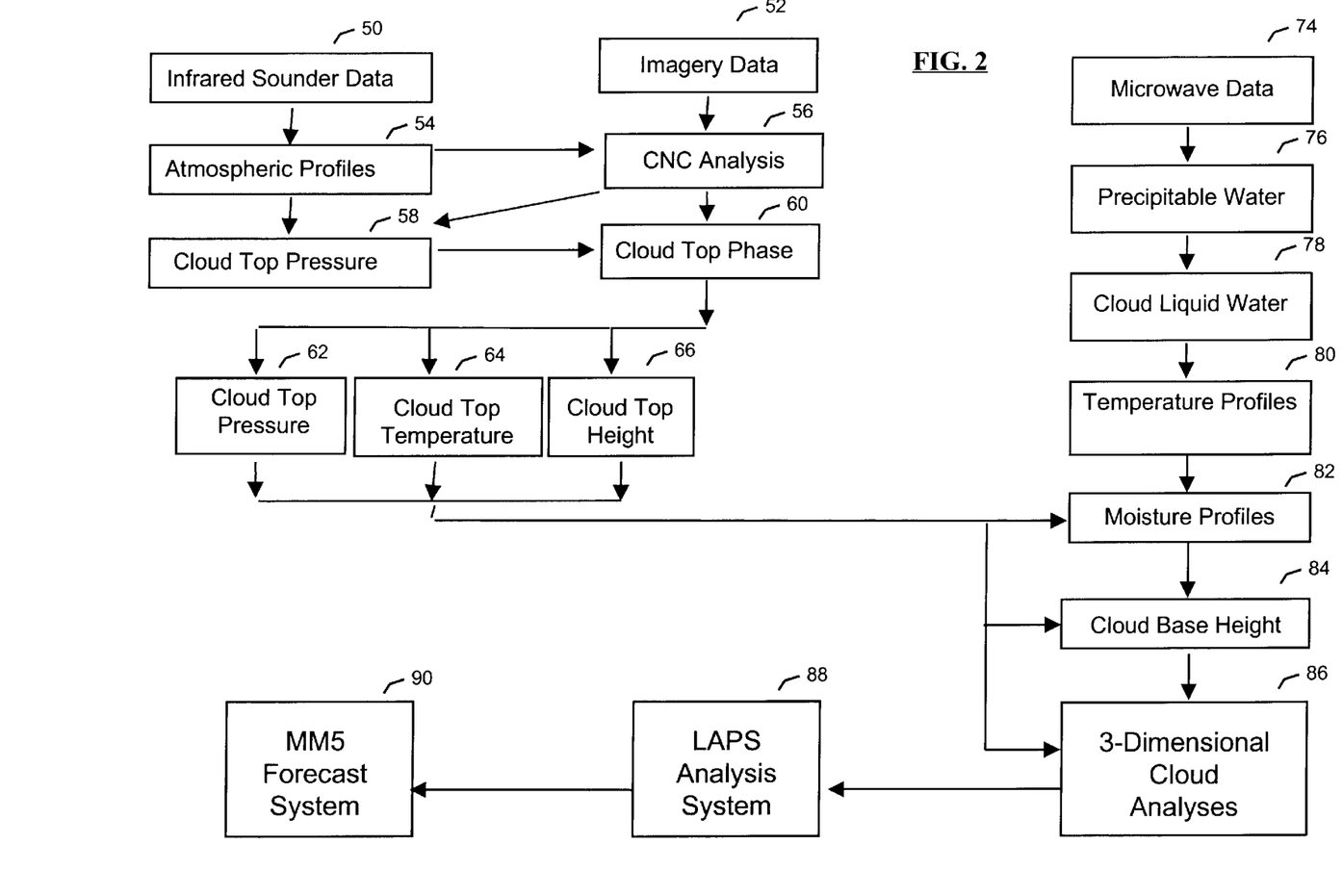
FIG. 2 depicts a flow diagram for the determination atmospheric conditions including a cloud base height based on satellite observation data, according to the present invention.

FIG. 2 depicts a flow diagram for the determination of atmospheric conditions using satellite based observation. The flow diagram includes steps performed at a weather station 20 based on atmospheric satellite data received from infrared sounder, imager and microwave data instruments. In step 50, the weather station 20 receives infrared sounder data. The weather station 20 may receive the infrared sounder data from a satellite, from a network or from a database. In step 52, the weather station 20 receives EO imager data from a satellite, a network or a database. In step 54, the weather station 20 determines atmospheric profiles based on the infrared sounder data 50 and cloud top pressures in a well known manner. The atmospheric profiles illustratively include profiles of temperature, and pressure in the atmosphere.

In step 56 of FIG. 2, the weather station 20 performs cloud or no-cloud (CNC) analysis on the EO imager data 52 based on the atmospheric profiles 54. The atmospheric profiles are used in CNC analysis to account for variances in the absorption of electromagnetic radiation at different frequencies by the earth/atmosphere system. The variances are due in large part to spectral differences between ice particles and cloud water droplets and the different surface conditions on the Earth. Each of these features have a different effect on the absorption and reflection of solar and terrestrial electromagnetic radiation. Then in step 56, the spectral information in each of the imagery channels is examined to determine the presence of clouds. If the difference or ratio between radiances of two or more spectral bands changes by more than some amount, known as the cloud detection threshold, a cloud is implied.

In step 58, the cloud top pressure 58 is determined based on the infrared sounder data. This is done in a well known manner, for example, as described by Wylie, Menzel, Woolf, and Strabala in a paper entitled "Four Years of Global Cirrus Cloud Statistics Using HIRS," Journal of Climate, Vol. 7, 1994 pp. 1972–1986, hereby incorporated by reference herein. The model assumes the presence of a cloud at some fixed height in the atmosphere and then uses the retrieved atmospheric profiles to calculate the upwelling radiance in all sounding channels that would be expected for such a cloud. Expected radiances are compared to the observed radiances to confirm the presence of a cloud at that level. If the differences between any set of expected and observed radiances is too large, the location of the cloud is move upward and the process repeated until the location of the cloud is determined or the absence of a cloud is concluded.

Figure 3:
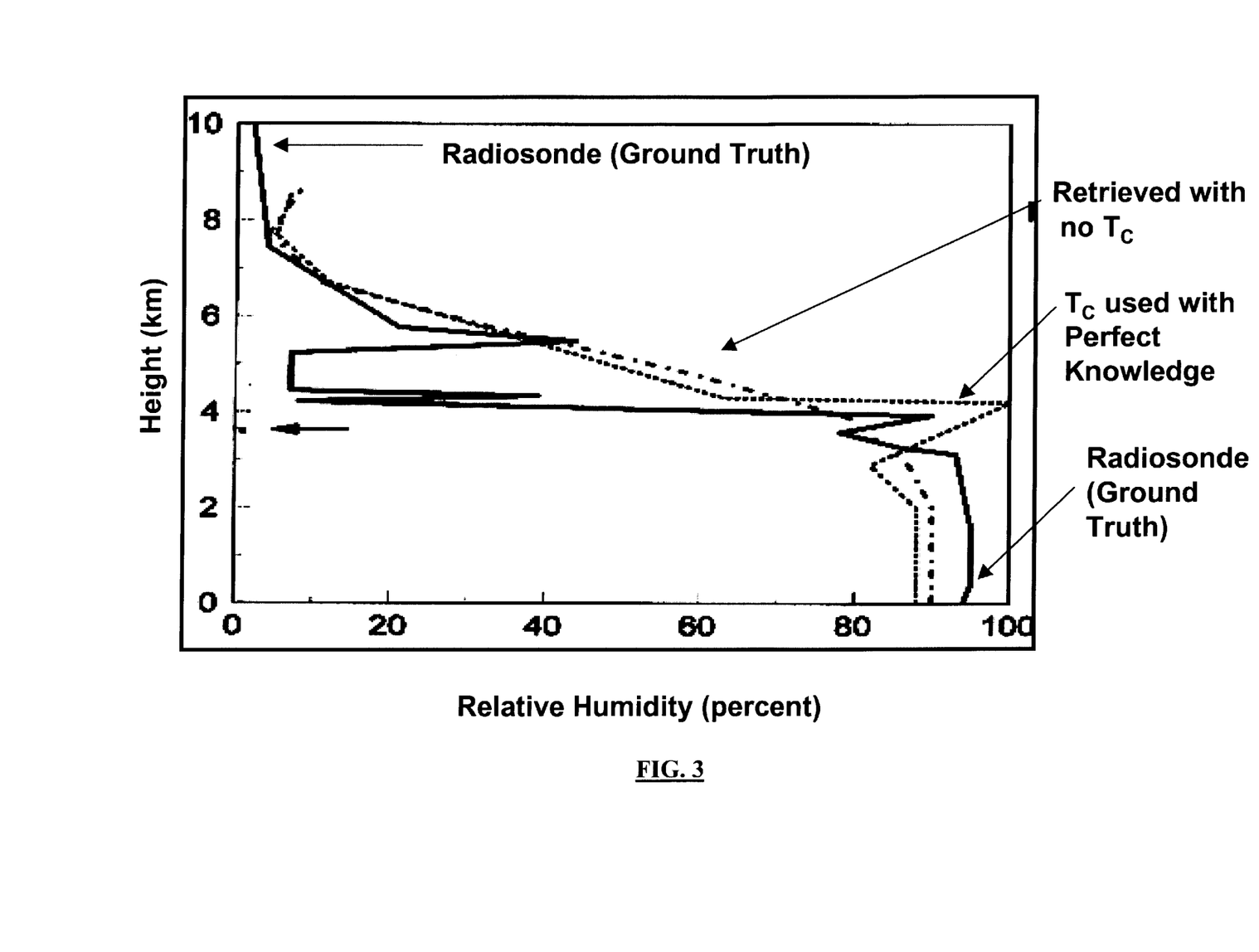
FIG. 3 depicts a graph of altitude above the earth versus relative humidity for radiosonde data and relative humidity retrieved from satellite observation with and without a cloud top temperature constraint.

In step 60, the weather station determines the cloud top phase for all pixels determined to contain clouds in step 56. This may be done in a well known manner based on the technique described in Hutchison, Etherton, Topping and Huang, entitled "Cloud Top Phase Determination From the Fusion of Signatures In Daytime AVHRR Imagery and HIRS," International Journal of Remote Sensing, vol. 18, 1997 pp. 3245–3262, hereby incorporated by reference herein. If cloud top temperatures obtained from the AVHRR sensor are –40 C. or colder, ice must be present. If these temperatures are warmer than –40 C., the cloud top phase algorithm examines the spectral characteristics of each pixel and compares them against known characteristics for water droplets and ice particles. Where ambiguities exist, cloud top pressures from step 58 are used as the final referee. The result of this process is data that includes a final cloud top pressure 62, a cloud top temperature 64 and a cloud top height 66. In step 74, the weather station 20 receives microwave data either from a satellite, a network or a database. Based on the microwave data, the weather station calculates precipitable water on a pixel by pixel basis in step 76 from microwave imagery. There are numerous, well known techniques for determining precipitable water including the technique disclosed in Wilheit and Chang, entitled "An Algorithm for Retrieval of Ocean Surface and Atmospheric Parameters" Observations of the Scanning Multi-Channel Microwave Radiometer" Radio Science, vol. 15, 1980, pp. 525–544, hereby incorporated by reference herein. Then in step 78, cloud liquid water (CLW) is determined based on the same microwave data. This may illustratively be done using the technique disclosed in Wilheit T. T., and A. T. C. Chang above. Then in step 80, temperature profiles are determined from microwave sounder data using the well known physical relaxation retrieval algorithm developed by Rosenkranz. Rosenkranz, Hutchison, Hardy and Davis entitled "An Assessment of the Impact of Satellite Microwave Sounder Incidence Angle and Scan Geometry on the Accuracy of Atmospheric Temperature Profile Retrievals." Journal of Atmospheric and Oceanic Technology, vol. 14, 1997 pp. 488–494. Then in step 82, the weather computer system 20 determines moisture profiles on a pixel by pixel basis. A preferred technique for performing this step uses satellite observation as described illustratively in Wilheit, T. T. and K. D. Hutchison, 1997: "Water Vapor Profile Retrievals from SSM/T-2 Data Constrained by Infrared-Based Cloud Parameters," International Journal of Remote Sensing, vol. 18, pp. 3263–3278, hereby incorporated by reference herein. Specifically, cloud top temperature information, determined in step 64, is used to constrain the retrieval of relative atmospheric humidity and moisture profiles. The result is shown in FIG. 3, which depicts a graph of the height or altitude in kilometers and the relative humidity measured from a radiosonde, and measured using retrievals from satellite microwave data with and without the cloud top temperature constraint. The radiosonde measurement is a conventional reference measurement for measuring relative humidity. The retrieval of relative humidity constrained by the cloud top temperature (Tc) approaches radiosonde line, particularly in the portion of the graph between 3 and 4 kilometers, where sharp points of inflection are observed in both graphs. The retrieval of relative humidity without a Tc constraint does not exhibit sharp points of inflection. For this reason, in a preferred embodiment of the invention, relative humidity data and moisture profiles determined from satellite observation and constrained by the cloud top temperature determined in step 64 are used.

After the moisture profiles are determined in step 82, in step 84, the moisture profiles are used with the cloud top height to retrieve a cloud base. However, the moisture profiles are constrained by the cloud top height only if the phase is water for the highest cloud in the pixel. If ice clouds are present, then the cloud top temperature cannot be accurately determined using satellite observation in step 64 which makes the heights, in step 66, erroneous. Thus, in determining the moisture profiles in step 82 and cloud base height in step 84 using satellite observation, it is critical that no ice clouds are contained in the microwave pixel. The process of identifying the cloud base height is explained at length below with reference to FIG. 4. However, it is important to note that the cloud base spectral signature is only evident in the microwave sounder data when accurate knowledge of the cloud top temperature and height are known by another sensor such as the AVHRR sensor.

In step 86, the cloud base height and cloud layer data are collected in a three dimensional cloud analysis module of the computer system 20. The three dimensional cloud analysis module collects the cloud top heights, cloud base heights and cloud layer pixel data in real time. This module then creates a three dimensional view of clouds by assembling the individual pixels from the imagers, each of which includes a location and a time parameter and cloud data, into a composite depiction of a portion of the earth's atmosphere at different times. Each three dimensional cloud depicted typically comprises a plurality of pixels having adjacent locations and a close or simultaneous time of observation. Each pixel contributes a cloud base height and cloud top height among other information, such as temperature and moisture information, to the composite depiction. The depiction may be displayed on a display terminal to a user for visualization of present weather conditions and for tracking changes in weather conditions in three dimensions. The depiction may also be utilized to determine cloud-free lines of sight from a point on the earth's surface to various points in the atmosphere and vice-versa. The lines of sight are determined based on geometric projections between an arbitrary point on the earth's surface, or in the atmosphere, and the edges of the clouds depicted. The present invention may be particularly advantageous when lines of site and cloud conditions are desired at remote locations where ground observation is not available, such as over a body of water.

Figure 4:
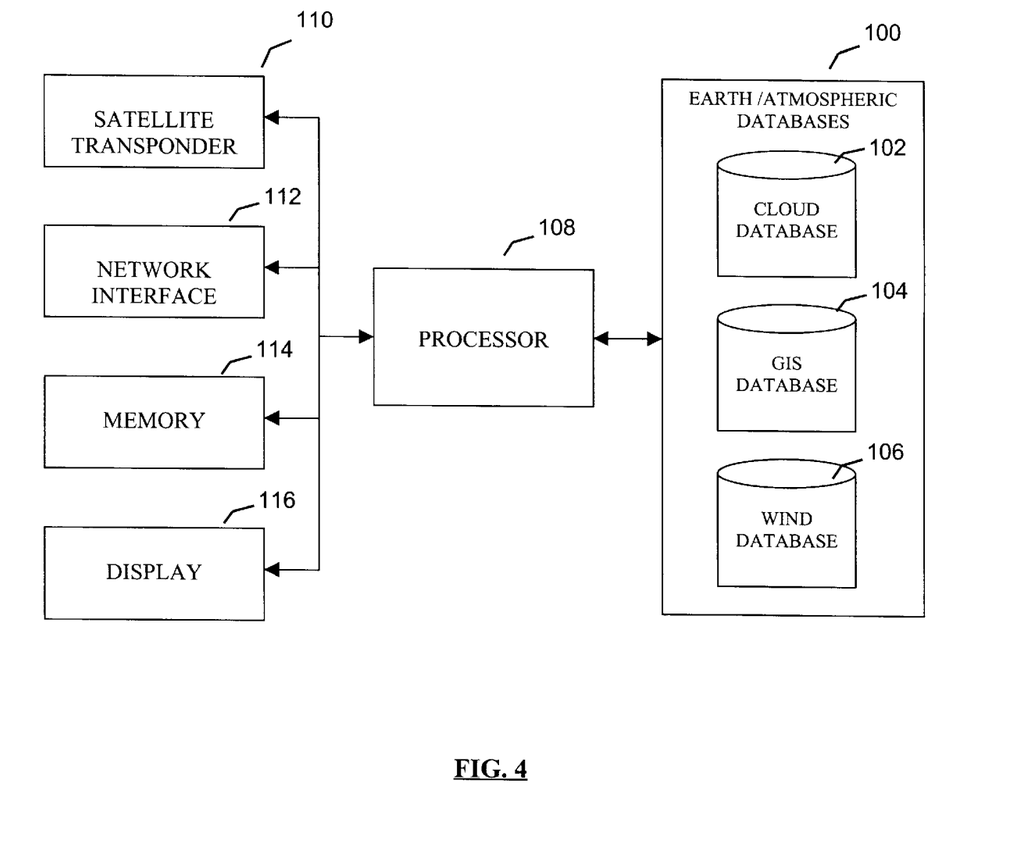
FIG. 4 depicts an internal view of a weather computer system.

In step 88, the three dimensional cloud analyses are fed into a central weather observation system, such as the well known LAPS analysis system. The LAPS analysis system may be the weather computer system 20 depicted in FIG. 1, an illustrative internal view of which is depicted in FIG. 4. The LAPS analysis system includes a plurality of databases. For example, the LAPS system integrates a geographic information system ("GIS") database 104 with a cloud database 102 and a wind database 106 as well as other databases, not shown, which may include atmospheric observations, including ground-based observations, earth observations, and physics models mathematically relating the information in the databases 100 together. Each of the databases 100 may be said to include weather models, in so far as the data in each database 100 may be used to determine, visualize or predict local or global weather conditions. The LAPS system historically has used three dimensional cloud models for weather visualization, but these models are based almost exclusively on ground-based observations. Therefore, LAPS analyses are very poor in regions which do not have a large amount of these surface observations. However, determination of cloud top heights and base heights from satellite based observation, according to the present invention, permits the accurate global determination of three dimensional cloud data collected in step 86 to be sent to and stored in the LAPS system for visualization and simulation.

The GIS database 104 permits retrieving a geographic model of at least a portion of a planet's surface. The retrieved geographic model may then be related to the three dimensional cloud depictions or models stored in a digital format in the cloud database 102. Typically the relationship is made based on the location information of the underlying pixel data that comprises the three dimensional cloud depictions. Subsequently, the three dimensional models of the clouds may be displayed with the geographic model based on the location information, permitting localized or global weather visualization.

Referring to FIG. 4, the LAPS or weather computer system 20 may further include a processor 108, coupled to a satellite transponder 110, a network interface 112, a memory 114 and a display 116. The satellite transponder 110 may receive satellite observations which the processor 108 may in turn store in one of the databases 100. The network interface 112 is disposed in communication with a computer network, such as the Internet, for receiving and transmitting weather data, including ground based observations, to other weather computer systems 20 or remote databases. The memory 114 may store data and program instructions which are executed by the processor 108. For example, the memory 114 may store program instructions for carrying out steps 50–90 depicted in FIG. 2 and steps 150–156 of FIG. 5 on satellite observations received via the satellite transponder 110, the database 102 or the network interface 112. The memory may include random access memory ("RAM"), read only memory ("ROM") or information storage and retrieval devices such as hard disk or CD-ROM drives. The memory 112 may receive the program instructions from the network interface 112 or from a computer useable medium such as a hard or floppy disk or a CR ROM having computer program logic stored thereon. The display 116 is coupled to the processor 108 and may display weather or other information as required.

In step 90, a forecasting system, such as the well known MM5 forecasting system, projects future cloud and weather conditions based upon data output from the LAPS analysis system in a well known manner. The MM5 forecasting system may be part of the weather computer system 20 depicted in FIGS. 1 and 4. Alternatively, the MM5 forecasting system may be coupled to the LAPS system or the weather computer system 20 over a network.

Figure 5:
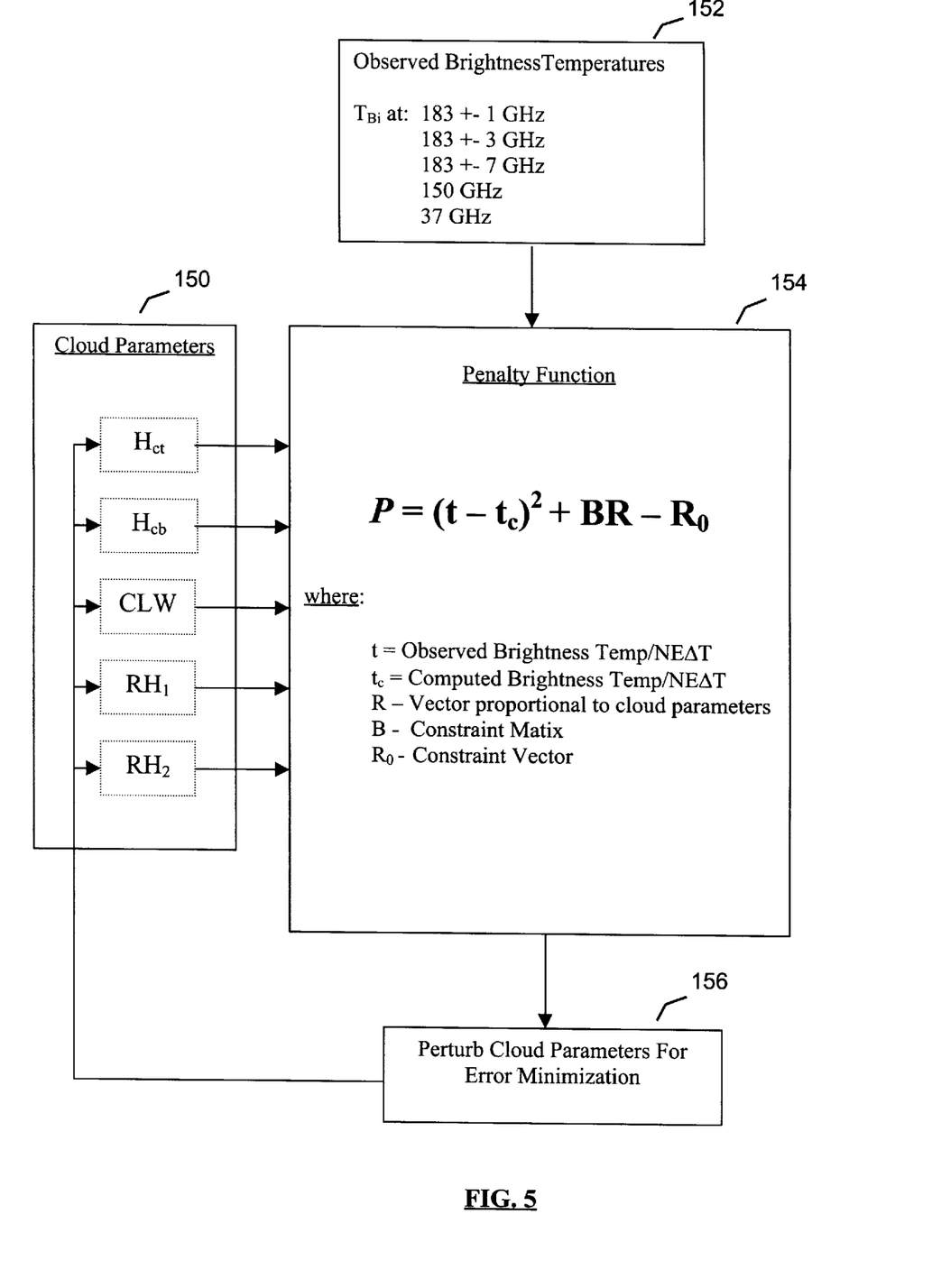
FIG. 5 depicts a method for determining the base height of a cloud using satellite observation data, according to the present invention.

FIG. 5 depicts a preferred embodiment of a method for determining a cloud base height according to the present invention. According to the method, cloud parameters 150 and observed brightness temperatures 152 are input to a penalty function 154. The penalty function 154 sends an output to an error minimization block 156, which alters the cloud parameters in successive iterations in order to minimize the penalty function.

The retrieved cloud parameters are the cloud top height ($H_{ct}$), the cloud base height ($H_{cb}$), the cloud liquid water content (CLW), the relative humidity above the cloud ($RH_1$) and the relative humidity below the cloud ($RH_2$). Initially, $H_{ct}$ is retrieved (step 62) based on the infrared sounder and EO imager data. In a preferred embodiment, as initial conditions for the system, it is assumed that the temperature profile is determined from passive microwave temperature sounder data or from a meteorological analysis, that a liquid cloud layer exists from height, $H_{cb}$, to height $H_{ct}$, with uniformly distributed liquid water content and 100% relative humidity. As an initial estimate, the vertical integral of the cloud liquid water content is CLW and is taken to be 100 g/m$^2$ at the initial condition. $RH_1$ is the relative humidity above the cloud layer and $RH_2$ the relative humidity below the cloud layer; both are assumed to be constant at 50%. These initial conditions are most relevant to a stratiform cloud. However, other initial conditions, for example, one with a constant mixing ratio reaching saturation at the cloud base, might be considered more appropriate in measuring parameters associated cumuliform clouds.

In one embodiment of the invention, a channel set which is available on the operational DMSP satellites through a subset of the combination of the SSM/I and SSM/T-2 instruments is used. These channel frequencies are set forth in block 152 in FIG. 5.

The penalty function block operates on the cloud parameters in one or more iterations. The penalty function has the form below:

$$P=(t-t_c)^2+(B(R-R_0))^2$$

Each element of the vector, t, is the observed brightness temperature for a channel divided by the NE$\Delta$T for that channel and, $t_c$, is the corresponding vector of computed brightness temperatures. This part of the penalty function represents the information content of the radiances themselves. The elements of the vector, R, are proportional to the amplitudes of the 5 independent variables—the cloud parameters. The matrix, B, and the vector $R_0$ constitute a set of linear constraints on the retrieval. They are scaled so that each element of $R_0$ has unit uncertainty. The cloud top height derived from infrared observations would be one such constraint; other available information could also be inserted into the solution through this mechanism.

The vector $t_c$ is, in general, related to the vector R in a nonlinear manner. Our approach for solving for the minimum value of P, is to linearize the relationship between $t_c$ and R about some assumed value (first guess) for R. The solution for a value of R that minimizes the value of the linearized approximation to P is a straightforward exercise in linear algebra. The process is then iterated until satisfactory convergence is obtained.

The penalty function is expanded to produce a locally linearized algorithm of the form:

$$R=Gt$$

Keeping in mind that each element of t has been scaled to have unit NE$\Delta$T, the uncertainty in each element of R, $\delta R_j$ due to the NE$\Delta$T is given by:

$$\delta R_j=(\Sigma(Gj,i))^{1/2}$$

In block 156, each cloud parameter is perturbed in order to determine the sensitivity of the penalty function to changes in each parameter. Subsequently, one or more of the cloud parameters may be changed in the direction which minimizes error, illustratively using Newtonian minimization, and another iteration performed.

The source of the cloud base signature is twofold. The primary source of the signal is the step in the water vapor content found at the base of the cloud, shown in FIG. 3 by the sharp inflection in the relative humidity around 3–4 km in height. The SSM/T-2 was designed to provide data for the estimation of the water vapor profile and the method retrieves a specific detail of this profile. Even in the absence of a significant step in the water vapor content, some signal remains. This results from water vapor screening of the cloud liquid water content. For example, some of the frequencies are more strongly absorbed by water vapor than others. The cloud liquid water content in the lower part of the cloud can have a greater impact on the brightness temperatures at the less strongly absorbed frequencies than at the more strongly absorbed frequencies. The lower the cloud base, the stronger is this water vapor screening effect.

Figure 6:
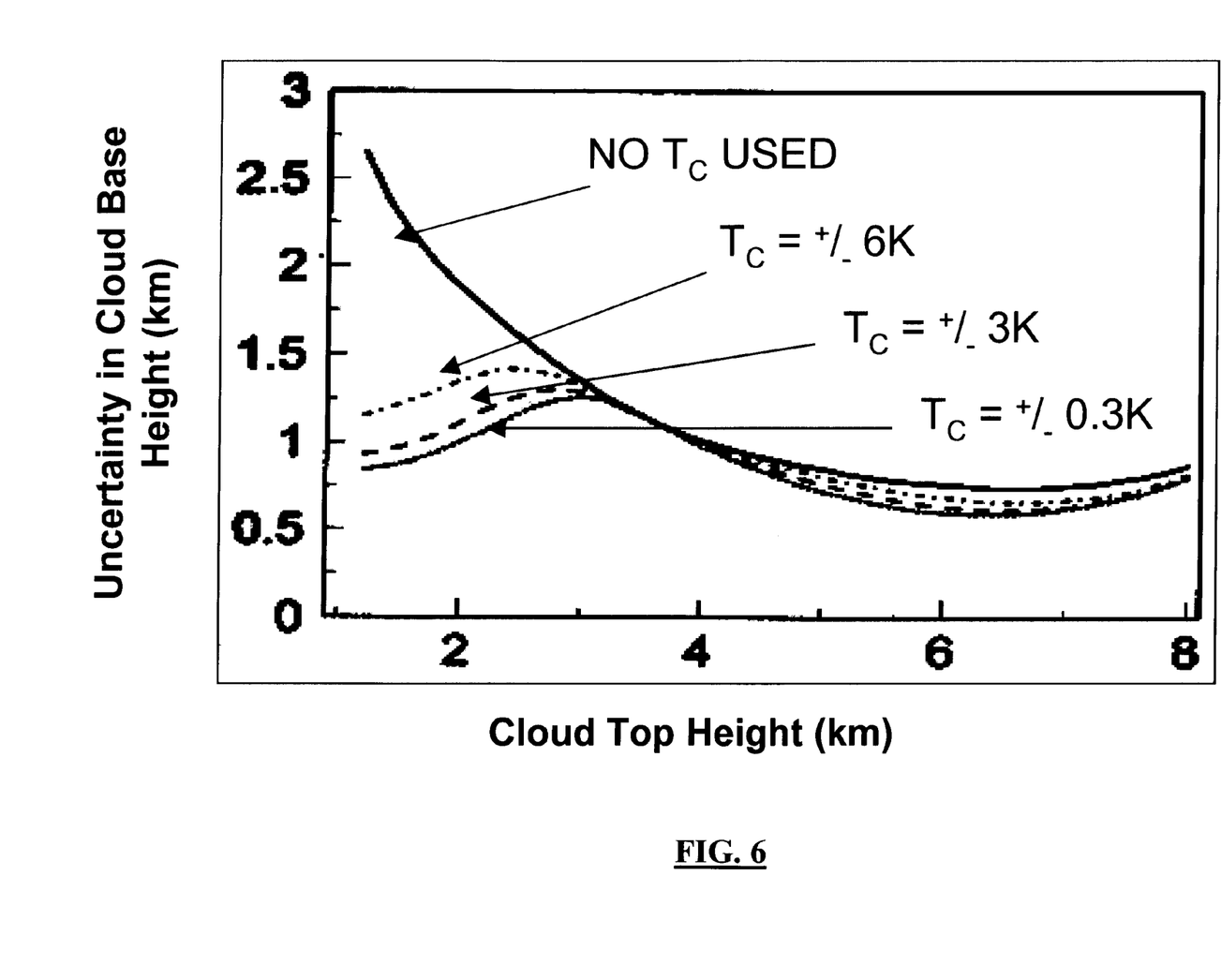
FIG. 6 depicts a graph of uncertainty in cloud base height vs. cloud top temperature according to the present invention.

FIG. 6 depicts a graph of uncertainty in cloud base height vs. cloud top temperature. The graph illustrates that accurate knowledge of the cloud top temperature is important for cloud base height measurements made from satellite observation when the cloud top is less than about 3 km in height. When the cloud top temperature is known to less than +−3 degrees Kelvin, useful cloud base height information is retrieved, according to the present invention, for low altitude clouds having a top height of around 1 km. This is advantageous for aviation, which is typically most concerned with low altitude clouds and cloud bases.

Although specific embodiments of the invention have been disclosed, it will be recognized by those having ordinary skill in the art that changes may be made to those embodiments without departing from the spirit and scope of the invention.

What is claimed is:

1. A method of characterizing atmospheric clouds in three dimensions from retrieval on satellite meteorological data, comprising the steps of:

receiving satellite electro-optical, infrared, and microwave radiance data of a view, the view having a location and time information;

determining cloud top heights of clouds in the view based on the electro-optical and infrared radiance data and determining moisture profiles of the view based on the microwave radiance data; and retrieving cloud base heights of clouds in the view based on the moisture profiles and the cloud top heights.

2. The method according to claim 1, further comprising the steps of:

determining cloud top temperatures of clouds in the view based on the electro-optical and infrared radiance data; and constraining the determining of the moisture profiles based on the cloud top temperatures.

3. The method according to claim 2, further comprising the step of:

retrieving cloud cover and cloud top phase of clouds in the view based on the electro-optical and infrared radiance data.

4. The method according to claim 1, further comprising the steps of:

creating three dimensional, digital models of the clouds in the view based on the cloud top heights and cloud base heights determined in the determining steps and on the location information.

5. The method according to claim 4, further comprising:

retrieving a geographic model of at least a portion of a surface of a planet, and displaying the three dimensional, digital models of the clouds with the geographic model based on the location information.

6. The method according to claim 5, further comprising the step of:

retrieving weather models from a database; and forecasting future weather conditions at the at least a portion of the surface of the planet based on the retrieved weather models, the geographic model and the digital models of the clouds.

7. A computer program product for causing a computer to characterize atmospheric clouds in three dimensions from retrieval on satellite meteorological data, comprising:

a computer useable medium having computer program logic stored therein, wherein the computer program logic comprises:

receiving means for causing the computer to receive satellite electro-optical, infrared, and microwave radiance data of a view, the view having a location and time information;

determining means for causing the computer to determine cloud top heights of clouds in the view based on the electro-optical and infrared radiance data and to determine moisture profiles of the view based on the microwave radiance data; and retrieving means for causing the computer to retrieve cloud base heights of clouds in the view based on the moisture profiles and the cloud top heights.

8. The computer program product according to claim 7, further comprising:

determining means for causing the computer to determine cloud top temperatures of clouds in the view based on the electro-optical and infrared radiance data; and constraining means for causing the computer to constrain the determining of the moisture profiles based on the cloud top temperatures.

9. The computer program product according to claim 8, further comprising:

retrieving means for causing the computer to retrieve cloud cover and cloud top phase of clouds in the view based on the electro-optical and infrared radiance data.

10. The computer program product according to claim 7, further comprising:

creating means for causing the computer to create three dimensional, digital models of the clouds in the view based on the cloud top heights, the cloud base heights and the location information.

11. The computer program product according to claim 10, further comprising:

retrieving means for causing the computer to retrieve a geographic model of at least a portion of a planet's surface; and displaying means for causing the computer to display the three dimensional, digital models of the clouds with the geographic model based on the location information.

12. The method according to claim 11, further comprising:

retrieving means for causing the computer to retrieve weather models from a database; and forecasting means for causing the computer to forecast future weather conditions at the at least a portion of the planet's surface based on the retrieved weather models, the geographic model and the digital models of the clouds.

13. An apparatus for characterizing atmospheric clouds in three dimensions from retrieval on satellite meteorological data, comprising:

a satellite transponder for receiving satellite electro-optical, infrared, and microwave radiance data of a view, the view having a location and time information;

a memory for storing program instructions; and a processor disposed in communication with the satellite transponder and the memory, the processor determining cloud top heights of clouds in the view based on the electro-optical and infrared radiance data, the processor determining moisture profiles of the view based on the microwave radiance data, the processor retrieving cloud base heights of clouds in the view based on the moisture profiles and the cloud top heights and the processor storing the cloud top heights, moisture profiles and the cloud base heights in the memory.

14. The apparatus according to claim 13, wherein the processor determines cloud top temperatures of clouds in the view based on the electro-optical and infrared radiance data, and the processor constraining the determining of the moisture profiles based on the cloud top temperatures.

15. The apparatus according to claim 14, wherein the processor retrieves cloud cover and cloud top phase of clouds in the view based on the electro-optical and infrared radiance data.

16. The method according to claim 13, further comprising:

a cloud database; and wherein the processor creates three dimensional, digital models of the clouds in the view based on the cloud top heights, the cloud base heights and the location information and the processor stores the three dimensional, digital models of the clouds in the cloud database.

17. The apparatus according to claim 16, further comprising:

a geographic information system for storing geographic models; and wherein the processor retrieves a geographic model of at least a portion of a planet's surface from the geographic information system and displays the three dimensional, digital models of the clouds with the geographic model based on the location information.

18. The apparatus according to claim 17, further comprising:

a weather model database; and wherein the processor retrieves weather models from the weather model database and forecasts future weather conditions at the at least a portion of the planet's surface based on the retrieved weather models, the geographic model and the digital models of the clouds.

* * * * *